E. C. & H. L. LITCHFIELD.
DUST CAP AND WHEEL HOLDER.
APPLICATION FILED SEPT. 22, 1915.

1,228,035.

Patented May 29, 1917.

Witness:
G. C. Higham.

Inventors
E. C. Litchfield
H. L. Litchfield,
by Chamberlin Freudenreich
Attys.

UNITED STATES PATENT OFFICE.

EDGAR C. LITCHFIELD AND HENRY L. LITCHFIELD, OF WATERLOO, IOWA, ASSIGNORS TO THE LITCHFIELD MANUFACTURING COMPANY, OF WATERLOO, IOWA, A CORPORATION OF IOWA.

DUST-CAP AND WHEEL-HOLDER.

1,228,035.  Specification of Letters Patent.  Patented May 29, 1917.

Application filed September 22, 1915. Serial No. 51,941.

*To all whom it may concern:*

Be it known that we, EDGAR C. LITCHFIELD and HENRY L. LITCHFIELD, citizens of the United States, residing at Waterloo, county of Blackhawk, State of Iowa, have invented a certain new and useful Improvement in Dust-Caps and Wheel-Holders, and declare the following to be a full, clear, and exact description of the same, such as will enable others skilled in the art to which it pertains to make and use the same, reference being had to the accompanying drawings, which form a part of this specification.

Our invention, viewed in one of its aspects, has for its object to produce a simple and durable device for effectively holding a wheel upon a shaft. Viewed in another of its aspects our invention may be said to have for its object to produce a simple and novel device for limiting the axial movement of a wheel in either or both directions along the shaft on which it is mounted and at the same time covering the end of the shaft so as to exclude dust and dirt from the bearing.

Viewed in another of its aspects our invention may be regarded as having for its object to provide a simple and effective means for holding a driven wheel on a shaft and at the same time effectively lubricating the wheel and a driving wheel also mounted on the shaft and protecting the bearings against the entrance of dust and dirt.

The various features of novelty whereby our invention is characterized will hereinafter be pointed out with particularity in the claims; but, for a full understanding of our invention and of its objects and advantages, reference may be had to the following detailed description taken in connection with the accompanying drawing, wherein:

Figure 1:
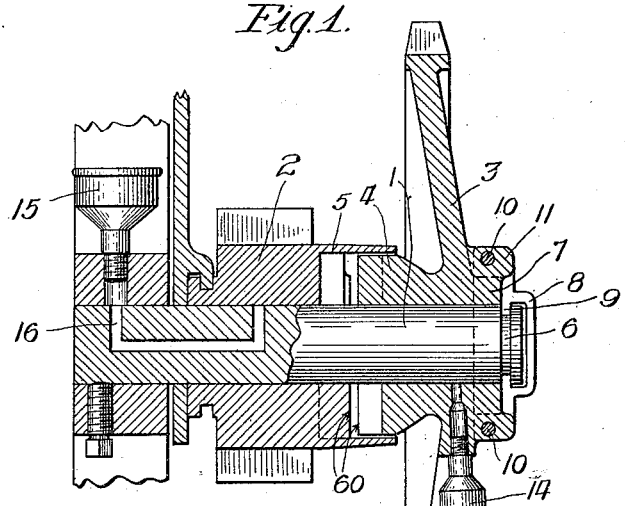
Figure 1 is an axial section of a mechanism embodying our invention in one of its forms and including a driven sprocket wheel and a driving pinion mounted on a stub shaft.
Figure 3:
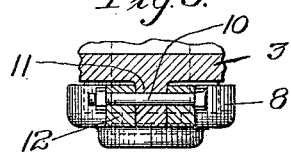
Fig. 3 is a section taken approximately on line 3—3 of Fig. 2.
Figure 2:
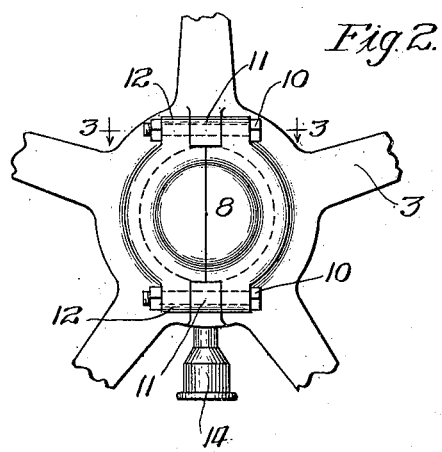
Fig. 2 is a view looking toward the left from the right hand end of Fig. 1, only the central portion of the sprocket wheel being shown.

Referring to the drawing, 1 represents a stub shaft on which are loosely arranged a pinion, 2, and a wheel, 3, the latter being at the outer end of the shaft. The wheel 3 has a hub, 4, of considerable length projecting toward the pinion and the pinion is provided with an annular flange, 5, surrounding this hub. On the adjacent faces of the hub and the pinion, respectively, are the complementary members of a clutch, 60, which is adapted to clutch the members 2 and 3 together or unclutch them at will. The flange, 5, is made long enough so that it will at no time pass off the end of the hub, and consequently it will prevent the entrance of dust and dirt between the members 2 and 3. The means illustrated for holding the wheel 3 on the shaft embodies various features of our invention which may be used together or alone, without departing from the invention as a whole. Near the outer end of the shaft is an annular groove, 6. On the outer side of the wheel 3 is a hub, 7, on which is a hub cap, 8, extending across and concealing the end of the shaft and provided with a tongue or rib 9, which fits into the groove in the shaft. The cap therefore serves the three functions of holding the wheel against movement inwardly on the shaft, holding the wheel against movement outwardly along the shaft, and of preventing the entrance of dust and dirt into the bearings from the outer side of the wheel. In addition the cap serves as a receptacle for grease or other lubricating material. In order to make the construction as simple as possible and give maximum strength and durability, the tongue or rib is preferably made integral with the body of the cap and therefore, in order to permit the cap to be placed on and be removable from the shaft it is made in sections divided from each other along longitudinal lines; no section having a circumferential length of more than 180 degrees: and consequently the cap may be assembled on the shaft by placing the shaft between the sections with the groove in the latter opposite the tongue members in the cap section and bringing them together about the shaft. In the arrangement illustrated, the cap is made of two parts but it will of course be understood that this number may be varied.

The sections of the cap may be secured to the wheel in any suitable way but, since it is necessary or at least highly desirable that the meeting edges of the sections be held together to make tight joints and prevent the entry of dust and dirt, we prefer to employ bolts, 10, which will pass through the several sections to clamp them upon the hub 7 and at the same time make tight joints between the sections. In order to insure that the cap will not come off when the service in which it is placed is severe, we prefer to provide the wheel with lugs, 11, and to form ears, 12, on the cap sections on opposite sides of the lugs; the fastening bolts, 10, passing through the ears and through the lugs, so that the cap cannot be removed from the wheel without first removing the bolts.

The wheel bearing on the shaft may be additionally lubricated by means of an oil cup, 14, carried by the wheel 3 and the bearing for the pinion may be lubricated by means of a cup, 15, discharging through a passage, 16, in the shaft.

While we have, for the sake of brevity, illustrated and described with particularity a specific hub cap as embodying a preferred form of the main feature of our invention, we desire to have it clearly understood that the invention in its broader aspects is not limited to the specific hub cap so illustrated and described or even to a hub cap of any kind, but we intend to cover all forms and arrangements which come within the definitions of our invention constituting the appended claims, regardless of whether or not such forms and arrangements will perform all or even more than one of the functions of the specific hub cap illustrated.

We claim:

1. In combination, a shaft, a wheel provided with a hub arranged on said shaft, a sectional hub cap, and means for clamping said cap upon said hub and concealing one end of the shaft.

2. In combination, a shaft, a wheel provided with a hub arranged on said shaft, a hub cap divided along longitudinal lines into a plurality of sections, and means for fixing said sections upon said hub and concealing one end of the shaft.

3. In combination, a shaft, a wheel provided with a hub arranged on the shaft, a cup-shaped hub cap fixed upon said hub and with its mouth directed inwardly covering one end of said shaft, and the shaft and said cap having means for holding the wheel and the shaft against relative axial movements.

4. In combination, a shaft, a wheel provided with a hub arranged on the shaft, a hub cap divided along longitudinal lines secured to the hub and covering one end of the shaft, and said shaft and said cap having complementary tongue and groove members extending around the shaft and adapted to hold the wheel and the shaft against relative axial movements.

5. In combination, a shaft, a wheel on the shaft, an annular member surrounding the shaft, said member and said shaft having complementary interlocking tongue and groove members arranged angularly of the axis, said annular member being divided into sections to permit it to be slipped laterally upon the shaft, and means for fixing the said annular member to the wheel.

6. In combination, a shaft, a wheel on the shaft, a cap extending over one end of the shaft and fixed to the wheel, and the cap and the shaft having means for holding the wheel against inward movement along the shaft.

7. In combination, a shaft, a wheel on the shaft, a cap extending over one end of the shaft and fixed to the wheel, and the cap and the shaft having means for holding the wheel against outward movement along the shaft.

8. In combination, a wheel provided with a hub and a lug adjacent to the hub, a hub cap having parts lying on opposite sides of said lug, and a bolt passing through said lug and the adjacent parts of the cap.

9. In combination, a wheel provided with a hub and a lug adjacent to the hub, a longitudinally-divided hub cap having sections lying on opposite sides of said lug, and means for fastening the adjacent portions of said sections to said lug.

10. In combination, a wheel provided with lugs projecting outwardly therefrom on one side, a divided cap lying adjacent to said side and having its sections arranged on opposite sides of said lugs, and means for securing the said lugs to the adjacent portions of said sections.

11. In combination, a shaft, a wheel revoluble on one end of the shaft, a cap secured to the wheel and covering the extreme end of the shaft, the cap and the shaft having interlocking shoulders to hold the wheel against axial movement, the wheel having a hub on the inner side thereof, a member located on the shaft adjacent to said hub and rotatable with the shaft, said member having an annular shield extending therefrom and fitting around the hub.

In testimony whereof, we sign this specification.

EDGAR C. LITCHFIELD.
HENRY L. LITCHFIELD.

Copies of this patent may be obtained for five cents each, by addressing the "Commissioner of Patents, Washington, D. C."